(12) United States Patent
Loehr

(10) Patent No.: US 7,966,805 B2
(45) Date of Patent: Jun. 28, 2011

(54) HYDROXYL AMINE BASED STAGED COMBUSTION HYBRID ROCKET MOTOR

(75) Inventor: Richard D. Loehr, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 496 days.

(21) Appl. No.: 11/748,843

(22) Filed: May 15, 2007

(65) Prior Publication Data

US 2009/0211227 A1    Aug. 27, 2009

(51) Int. Cl.
*C06D 5/04*    (2006.01)
(52) U.S. Cl. .......................................... 60/218; 60/253
(58) Field of Classification Search .................. 60/207, 60/218, 219, 251, 253, 39.462, 723
See application file for complete search history.

(56) References Cited

U.S. PATENT DOCUMENTS

| | | | |
|---|---|---|---|
| 3,065,597 A * | 11/1962 | Adamson et al. | 60/220 |
| 3,068,641 A * | 12/1962 | Fox | 60/207 |
| 3,898,794 A * | 8/1975 | Ariga | 60/39.181 |
| 5,485,722 A | 1/1996 | Schmidt et al. | |
| 5,727,368 A * | 3/1998 | Wernimont et al. | 60/218 |
| 6,254,705 B1 * | 7/2001 | Anflo et al. | 149/1 |
| 6,272,846 B1 * | 8/2001 | Schneider | 60/218 |
| 6,393,830 B1 | 5/2002 | Hamke et al. | |
| 6,679,049 B2 | 1/2004 | Devine et al. | |
| 6,991,772 B1 * | 1/2006 | Rusek | 423/580.1 |
| 7,665,292 B2 * | 2/2010 | Oren | 60/203.1 |
| 2002/0121081 A1 * | 9/2002 | Cesaroni et al. | 60/251 |
| 2005/0241294 A1 * | 11/2005 | Cesaroni | 60/251 |
| 2009/0120060 A1 * | 5/2009 | Coste | 60/257 |

FOREIGN PATENT DOCUMENTS

| | | |
|---|---|---|
| JP | 10-288091 A | 10/1998 |
| JP | 2002-020191 A | 1/2002 |
| JP | 2003-089590 A | 3/2003 |
| JP | 2007-023135 A | 2/2007 |

OTHER PUBLICATIONS

ISR and Written Opinion dated Oct. 30, 2008 in PCT Application No. PCT/US08/63550.

* cited by examiner

*Primary Examiner* — Michael Cuff
*Assistant Examiner* — Phutthiwat Wongwian
(74) *Attorney, Agent, or Firm* — Glenn H. Lenzen; Polsinelli Shughart PC

(57) ABSTRACT

A new rocket motor assembly configuration is disclosed. Amine based oxidizer is decomposed in the presence of a metallic catalyst to generate an oxygen rich hot gas stream. The hot gas stream is used to trigger a Magnesium based solid fuel in the combustion chamber. The thrust of the rocket motor may be regulated at multiple points. This design thus offers an IM compliant, thrust-adjustable rocket motor that is of a low hazard classification without compromising its performance.

18 Claims, 2 Drawing Sheets

HYDROXYL AMINE BASED STAGED COMBUSTION HYBRID ROCKET MOTOR

BACKGROUND

1. Field of Invention

The disclosure relates to an improved design of a rocket motor. More specifically, it relates to a safer and high-performance design of a hybrid rocket motor with an integrated thrust control mechanism.

2. Description of Related Art

Rocket motors may be generally divided into three categories based upon the types of propellant used and the mode of operation: solid, liquid and hybrid rocket motors. In a typical solid rocket motor, solid fuel elements or grains undergo combustion to generate thrust that propels the rocket. A liquid rocket motor generates thrust by combusting liquid fuels. Upon ignition, a typical solid or liquid fuel rocket motor burns the propellants uninterruptedly until all the propellants are exhausted. A hybrid motor, as the name suggests, may be characterized as a cross between a solid and a liquid fuel motor. While most hybrid rocket motors utilize a liquid oxidizer and a solid fuel, some hybrid motors use a combustible liquid fuel and a solid oxidizer.

Although significant progress has been made, many issues remain unsolved with current rocket motor design. The first problem relates to the safe handling and storage of the rocket motors. Most chemicals used in current rocket motors are of a high hazard classification. Moreover, many rocket motors fail to meet the Insensitive Munitions (IM) standard, which refers to insensitivity to shock, fire or penetration by ballistic projectiles. Despite great efforts over the past decades, rocket engineers have not succeeded in making a rocket that meets the IM standard without compromising the performance of the rocket.

The second issue associated with current rocket motor design is the difficulty and high cost required to include a modulation mechanism so that the thrust can be modified during operation of the rocket motor. Because complicated engineering is required to incorporate a thrust-adjusting means, most solid rocket motors do not possess thrust modulation capability. There is therefore a need for a means whereby the rocket thrust can be modulated as needed based on the desired vehicle flight profile.

The third problem arises from combustion products released by most rocket motors which usually contain toxic and corrosive products. These toxic gases may not only damage the launch vehicle, but they are also hazardous to the environment and pose a health risk to the ground workers who are usually exposed to them. Therefore, there is a need for a rocket motor that releases minimal amount of toxic gases during normal operation.

Finally, in order to achieve maximum efficiency, it is important to maintain a consistent oxidizer/fuel ratio during combustion. However, under traditional hybrid rocket motor design, it is difficult to maintain a consistent oxidizer/fuel ratio because the geometry of the solid fuel constantly changes during combustion. There is therefore a need for a design that enables a consistent oxidizer/fuel ratio.

SUMMARY

The instrumentalities described here overcome at least some of the problems outlined above by adopting a new staged combustion hybrid rocket motor design, which allows for an IM compliant propulsion system with a relatively low hazard classification. The new design accomplishes these goals by using a hydroxyl amine based liquid oxidizer, such as hydroxyl amine nitrate ("HAN"). HAN has good performance, low reactivity, low toxicity and excellent storage life. The current design also supports a hybrid method of propellant management and may help alleviate safety concerns resulting from the negative effects of intimate oxidizer/fuel composites.

The hydroxyl amine based liquid oxidizer may be suitably decomposed in a controlled manner by contacting a predetermined amount of the liquid propellant with a select catalyst to cause the liquid propellant to decompose into a hot gas comprising water steam, carbon dioxide and nitrogen. This hot gas may then be used as desired, for example, to provide rocket propulsion or rotary power for auxiliary power units. Preferably, the decomposed oxidizer may be used to cause combustion of the solid fuel in the first chamber.

In one preferred embodiment of the disclosure, the HAN is blended with glycerol such that the hot gas generated by the decomposition of the oxidizer is stoichiometrically oxygen rich by 10 to 15 percent. This improvement may help mitigate the shift in oxidizer/fuel ratio typically observed in traditional hybrid rocket motors which, in turn, may enhance the Specific Impulse (Isp) of the presently disclosed hybrid rocket motor throughout the length of the combustion.

According to this disclosure, rocket assembly and integration test may be conducted before the oxidizer is loaded. Indeed, the oxidizer may be loaded just prior to launcher installation, which affords greater flexibility to the production process. These features also afford safe handling of the device during assembly and test.

Since the hybrid combustion reaction relies on the decomposed oxidizer to react, thrust may be adjusted or stopped by metering the flow rate of Liquid fuel/oxidizer mix into the combustion chamber. Thus, the thrust may be adjusted as needed to meet the mission flight profile. Moreover, because the combustion products are relatively benign and less corrosive, the rocket motor under the new design may be less harmful to the launch vehicle and the environment.

DETAILED DESCRIPTION

A hybrid rocket motor is disclosed herein which contains an integrated thrust control mechanism and is both IM complaint and of a low hazard classification. The hybrid motor employs at least one catalyst to achieve controlled decomposition of the oxidizer. Both liquid oxidizers and gas oxidizers may be used. Although nitrous oxide is commonly used as a gas oxidizer, other oxidizers may be used. For purpose of this may be used interchangeably in this disclosure. The terms "liquid" and "fluid" are also used interchangeably throughout this disclosure.

Figure 1:
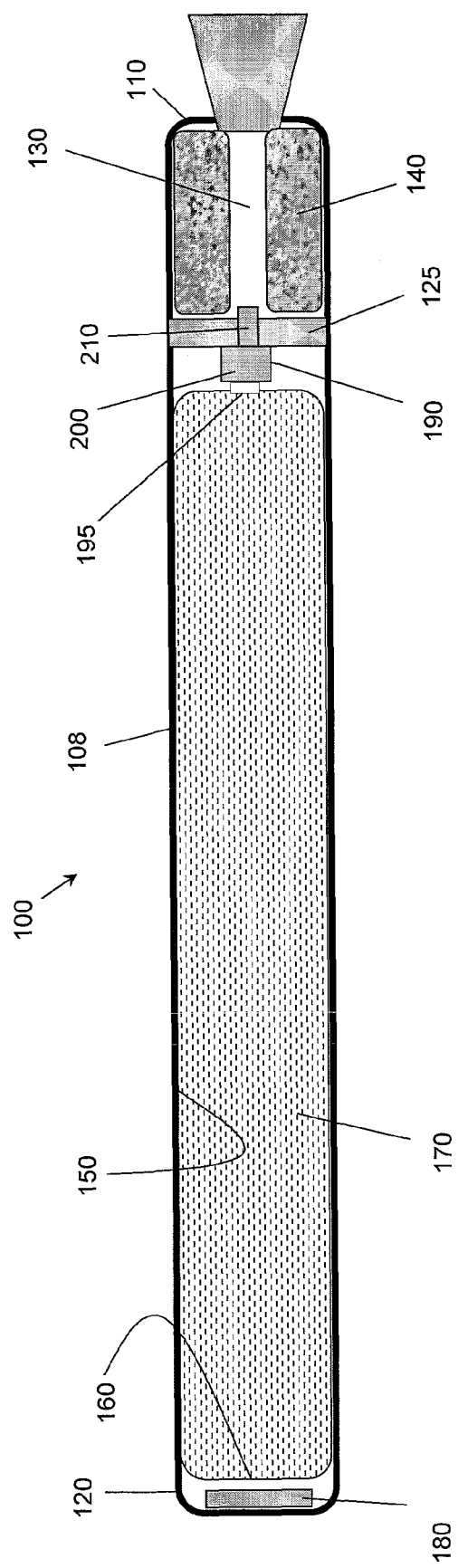
FIG. 1 is a drawing showing some major features of the disclosed hybrid rocket motor.

FIG. 1 illustrates major design features of the improved rocket motor. The hybrid rocket motor 100 of the present disclosure includes a housing 108 having at least two sections, a first end portion 110 and a second end portion 120, which may be separated by a separator 125.

The first end portion 110 may contain a first chamber 130 (also referred to as "the combustion chamber") which stores solid combustible materials 140 for use in combustion. The solid combustible materials 140 are preferably magnesium/hydroxyl-terminated polybutadiene (Mg/HTPB). Other solid propellants commonly used in the art may also be used, which may include, for example, Plexiglas (polymethyl methacrylate (PMMA)), high density polyethylene (HDPE), double base, GAP, gas generator fuels and black powder.

The second end portion 120 may contain a second chamber 150 which may, in turn, contain a bladder 160 for storing the oxidizers 170, which are preferably liquid and pressurized. A gas generator 180 is placed next to the bladder 160 in the second end portion of the rocket motor housing 108, and may be used to pressurize the bladder 160. Under the instant design, a large proportion of the propellant may be in solution with the HAN which results in a smaller HTPB grain and consequently a smaller insulated combustion chamber.

The first and second chambers may be in fluid communication via a flow control means for coupling the first chamber and the second chamber, and for selectively controlling the flow of materials there between. In one embodiment, the first and second chambers may be connected via a conduit designed to allow the flow of materials from the second chamber to the first chamber. More preferably, the coupling means may contain an injector 190 for injecting materials into the first chamber 130.

A forward fold bladder 160 which contains and is in direct contact with the oxidizers may be positioned at the back end of the second chamber 150. An opening (or outlet) 195 in the bladder 160 allows for the flow of the oxidizer 170 out of the bladder. The injector 190 may or may not be in direct contact with the opening 195. The oxidizer 170 that flows out of the bladder 160 is caused to be in contact with a catalyst 200, which catalyzes the decomposition of the oxidizer.

The catalyst 200 may be advantageously positioned between the first and second chambers. For the catalyst 200 to be operable, it is preferably positioned at a locale such that it may effectively contact and catalyze the decomposition of the oxidizer 170. In one embodiment, the catalyst 200 may be located in close proximity to the injector 190. The catalyst 200 may be optionally placed in a reactor (not shown), or the catalyst 200 may be placed directly inside the injector 190.

The use of an oxygen rich gas generator cycle at the catalyst interface may result in substantially higher reactivity with the catalyst. This effect may allow for demonstrably higher oxidizer flow rates for any given catalyst system and may thereby enable large thrust designs.

The reaction products generated by decomposition of the oxidizers 170 may be fed through the injector 190 into the chamber 130. In an embodiment, a flow controller 210 may be coupled to the injector 190 to regulate the flow rate of the reaction products, which may be in liquid or gaseous phase, or both, through the injector 190. "Coupled" as used herein means physically connecting two devices to each other, with or without other intermediate devices.

The reaction products may be pressurized before being injected by the injector 190. This pressurization may be accomplished by using a pressurant (not shown), such as helium or nitrogen or by using a pump (not shown). When hydroxyl amine nitrate ("HAN") is used, the reaction products contain mainly decomposed HAN in the form of hot gases containing water steam, carbon dioxide and nitrogen. The Oxygen rich gas generator input into the fuel grain/combustion chamber may exceed the auto ignition temperature of HTPB and may therefore negate the requirement for an ignition grain heating charge typically associated with HTPB hybrid rocket motors.

Suitable liquid oxidizers may possess several properties that are advantageous for the design disclosed herein. Liquid oxidizers that react readily and energetically with the fuel are preferred. The liquid oxidizer of choice preferably is not highly corrosive nor requires cryogenic conditions to exist in liquid state. In addition, it is preferable to use liquid oxidizers that are of a low hazard classification and are relatively stable for long-term storage.

Various classes of oxidizers may be used, including perchlorates, such as potassium perchlorate, ammonium perchlorate, and sodium perchlorate; nitrates, such as potassium nitrate, sodium nitrate, and ammonium nitrate; as well as both cyclic and linear nitramines. Examples of cyclic nitramines include crystalline 1,3,5,7-tetramethylenetetranitramine, commonly known as HMX, and crystalline 1,3,5-trimethylenetrinitramine, commonly known as RDX. Although other high density oxidizers, such as Nitric acid (IRFNA) or Nitrogen Tetroxide (NTO) may be used, the amine based liquid oxidizers are preferred, and the aqueous solutions of hydroxyl ammonium salts are most preferred because they possess a combination of desirable properties outlined above.

In a preferred embodiment, the liquid oxidizer is a mixture of HAN and glycerol. The HAN may be blended into the glycerol such that a stoichiometrically or near-stoichiometrically oxygen rich gas generator input may be generated to mitigate the typical oxidizer/fuel ratio shift during operation of the hybrid rocket motor. This mitigation of the oxidizer/fuel ratio shift, in turn, may enhance the specific impulse (Isp) of the improved hybrid rocket motor.

In another preferred embodiment, HAN may be obtained as a aqueous solution of about 82% (w/w), and may be further distilled to obtain a HAN solution of 90-95% (w/w). It may be desirable to use HAN with concentration of at least 90% because HAN at this concentration approaches the density of ammonium perchlorate that is commonly used in solid rocket motors. This feature may render the instant design comparable to other state of the art solid motors in terms of high density impulse.

Although an oxidizer in liquid form is preferred, a gel form of oxidizer may also be employed. The gel form may minimize propellant spillage in the event of a leak. HAN is typically used as a water based salt solution, the water content may be exploited to optimize gelling conditions. Several gelling techniques which exploit the water content have been used to obtain excellent gelled HAN propellants.

Aqueous solutions of hydroxylammonium salts possess a combination of properties that render them a good choice for use as a liquid oxidizer. For instance, most aqueous solutions of hydroxylammonium salts are liquid at room temperature, non-hazardous, stable over long-term storage and have reasonable viscosity. Because HAN demonstrates these desirable properties without compromising its performance, a rocket motor using HAN as an oxidizer may be IM compliant and of a low hazard classification while maintaining high performance.

The present disclosure also supports a hybrid method of propellant management and may help alleviate safety concerns resulting from the spatial intimacy between the oxidizer and the fuel. Because the solid fuel is separated from the principal oxidizer, the potential for inadvertent ignition or catastrophic failure is essentially eliminated. Because the mixing of oxidizer decomposition products with solid fuel may be regulated by the flow controller 210, the combination of propellant ingredients may be optimized regardless of whether they are solid or liquid. Moreover, because the solid fuel in the combustion chamber 130 does not contain any oxidizer, which is separately contained in the bladder 160, the hybrid motor of the present disclosure may be easily started, stopped, and restarted, thereby making the motor easily throttleable.

Yet another advantage of the presently disclosed design is that it may allow rocket assembly and integration tests to be performed without having the oxidizer physically loaded into the storage bladder 160. In fact, the oxidizer may be loaded just prior to launcher installation, which affords greater flexibility to the production process. This feature also enables safe handling of the device during assembly and test.

The liquid oxidizer may be suitably decomposed in a controlled manner by contacting a predetermined amount of the oxidizer, such as HAN, with a select catalyst to cause the oxidizer to decompose. The decomposed oxidizer may then be used as desired, for example, to provide rocket propulsion or rotary power for auxiliary power units. Preferably, the decomposed oxidizer may be used to cause combustion of the solid fuel in the first chamber 130.

More than one type of catalyst may be used. The catalyst(s) are preferably a solid catalyst housed in the injector 190. In addition, the catalyst may have an active metal component selected from the group consisting of platinum, Iridium, and Rhodium group metal catalysts, transition metal group catalysts and combinations thereof. The solid catalyst may be either supported or unsupported. If an unsupported catalyst is used, the active metal itself may be configured into a sponge or skeletal (wire mesh) configuration. A number of relatively inert metals or ceramic support materials may be used alone or in combination as a supported catalyst. A variety of supported catalysts are commercially available, such as Shell 405 catalyst (32% iridium on alumina) or one of the LCH series of catalyst such as LCH-207 (32% iridium on alumina), LCH-210 (10% platinum on alumina), and LCH-215 (12% rhodium on alumina), products of Rocket Research Company. An alumina support is the preferred support material.

In another embodiment where HAN-based liquid propellant is used, the propellant may also contain a fuel, such as triethanolammonium nitrate, hydroxylamine (free base), dimethylhydroxylammonium nitrate, diethylhydroxylammonium nitrate, diethylhydroxylamine (free base), triethylenediamine dinitrate, diethylenetriamine dinitrate, ethylenediamine dinitrate, methylammonium nitrate, dimethylammonium nitrate, trimethylammonium nitrate, methylhydrazinium nitrate, ethylenedihydrazinium dinitrate, hydroxyethylhydrazinium nitrate, di(hydroxyethyl)hydrazinium(1+) nitrate, hydrazinium (1+) formiate, hydrazinium (1+) acetate, hydrazinium (1+) carbazate, hydrazinium (1+) aminoacetate, triaminoguaninidium nitrate, carbohydrazide, carbohydrazide (1+) nitrate, carbohydrazide (2+) dinitrate, urea, formamide, N-methylforamide, N,N-dimethylformamide, guanidinium nitrate, 1,4-bis-cubanediammonium dinitrate, 3-nitro-1,2,4-triazol(5)one hydrazinium salt, 3-nitro-1,2,4-triazol(5)one ammonium salt, N-methyl-2-pyrrolidone, aziridine-derivatives, azetane derivatives, or combinations thereof. Preferably, the fuels are stored separately from the oxidizers.

An initiator may be employed in the second chamber 150 in order to initiate the HAN decomposition reaction in the presence of the catalyst. The initiator may be incorporated into a supported catalyst system to provide a so-called "one-shot catalyst". Suitable initiators include, for example, $[NO_2]BF_4$, $[NO_2]ClO_4$, $I_2O_5$ and $[NO_2]ClF_4$, and combinations thereof.

The HAN decomposition reaction of the process may be enhanced by the optional incorporation of thermally conductive path elements, such as a metal foam of a type described in U.S. Pat. No. 4,027,476, a wire, or a rod, into the catalyst bed itself or by employing the reaction exotherm by recirculating at least a portion of the hot gases from the initial HAN decomposition into a regenerative heat exchanger.

The controlled HAN decomposition reaction may be initiated at an elevated temperature, preferably at a temperature of between about 50° C. and about 250° C., more preferably at a temperature ranging from 80° C. to 120° C. An added advantage of using HAN is its excellent operating temperature range, which is well within the Air to Air missile operational temperature of −55° C. to 55° C.

The rate of HAN decomposition may be controlled by regulating the flow of HAN-based propellant out of the bladder 160 into the reactor or injector containing the catalyst(s) or by regulating the exit flow of the decomposed oxidizer from the reactor or injector into the chamber 130. In this manner, a runaway reaction of the HAN oxidizer or unwanted detonation of the solid fuel may be avoided. Thus, both the amount of HAN to be decomposed by the catalyst and the rate of the decomposition may be regulated as desired. In one aspect, decomposition of the oxidizer by the catalyst may be conducted as a continuous process with at least two repeatable steps. First, a measured amount of the liquid oxidizer 170 is passed into a reactor or the injector 190, which contains the catalyst(s) 200. Secondly, as the gaseous products resulting from the decomposition of the liquid oxidizer are exhausted from the reactor or the injector 190, more liquid oxidizers 170 are allowed to flow into the reactor or the injector 190 such that the pressure inside the reactor or the injector 190 remains substantially unchanged. These two steps may be repeated until all supply of liquid oxidizer runs out.

In one particular aspect of the present disclosure, the continuous process described above may be regulated or stopped as desired so that the hybrid motor may be operated in a controlled manner. For instance, because the combustion reaction in the first chamber 130 requires the decomposed oxidizers to be produced by the catalytic reaction prior to introduction to the combustion chamber 130, thrust produced by the rocket motor may be adjusted or stopped by metering the rate of flow oxidizer into the combustion chamber. Thus, the current design allows the thrust to be adjustable to meet the needs of different mission flight profiles.

Figure 2:
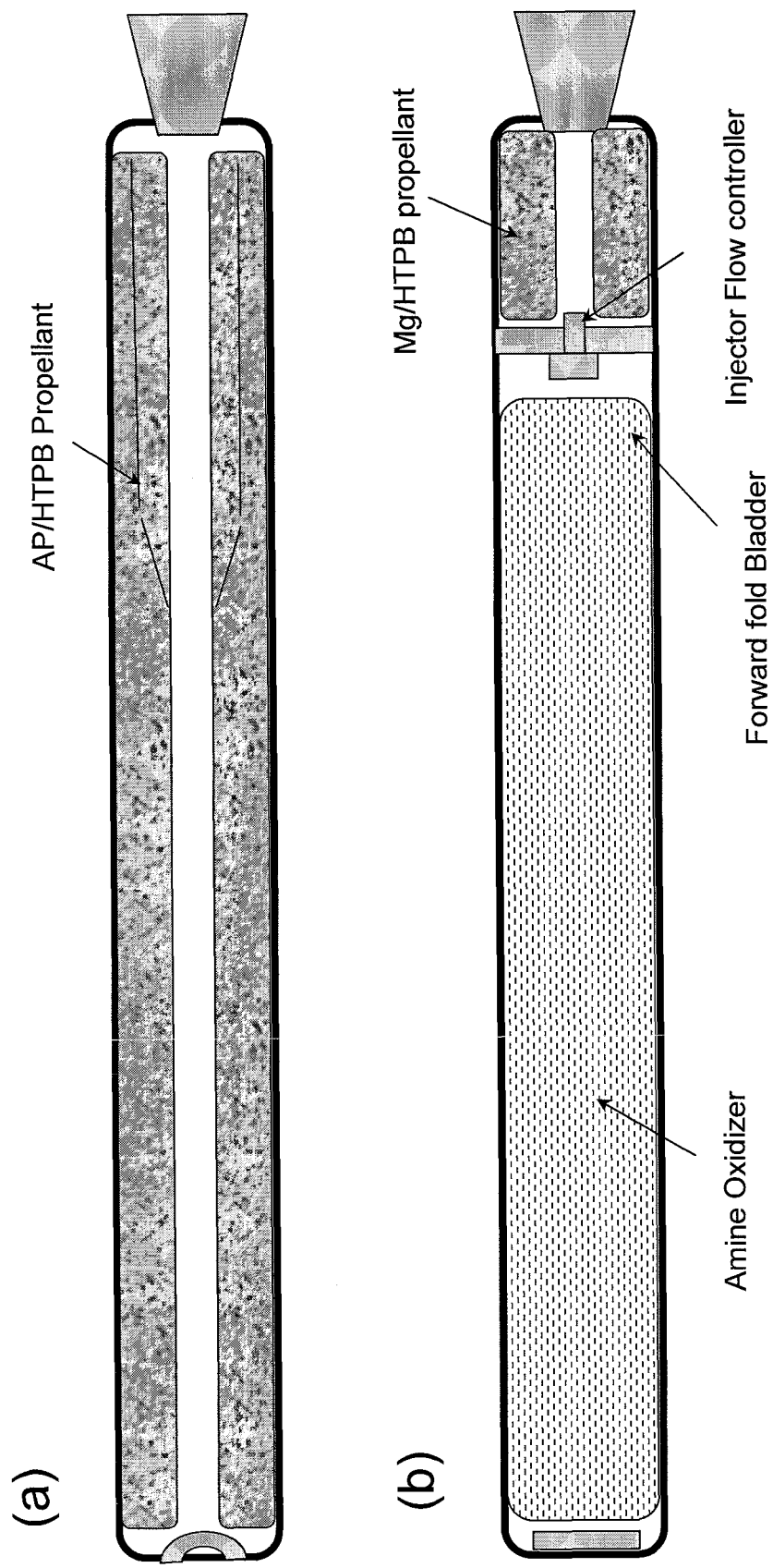
FIG. 2 is a side-by-side comparison of different design features of a conventional solid rocket motor (a) and the presently disclosed hybrid rocket motor (b).

FIG. 2 offers a side-by-side comparison of the different design features employed by a conventional solid rocket motor and the hybrid rocket motor of the present disclosure. When the performances of the two rocket motors are compared as described in Example 1, the hybrid motor configuration offers greater propulsive energy per unit volume than a conventional solid fuel rocket motor, as shown in Table 1.

In yet another aspect of the present disclosure, because the combustion products are relatively benign and non-corrosive, the rocket motor according to the instant design may cause relatively little harm to the launch vehicle and the environment. The exhaust of less toxicity may also pose less a threat to the health of the ground workers at the launching site.

TABLE 1

Performance Comparison between a Conventional Solid Motor and the Amine based Hybrid Motor

| Attribute | Solid | Hybrid |
|---|---|---|
| Case Dia. (In.) | 8 | 8 |
| Case Length (In.) | 65 | 65 |
| Propellant | AP/HTPB | HAN/Glycerol/HTMg |
| Propellant Density S.G. | 1.80 | 1.63 |
| Chamber Pressure (Psi) | 1800 | 1800 |
| Combustion Eff # | 0.98 | 0.90 |
| Isp @ 1800 psi (Sec.) | 232.5 | 243.0 |

TABLE 1-continued

Performance Comparison between a Conventional
Solid Motor and the Amine based Hybrid Motor

| Attribute | Solid | Hybrid |
| --- | --- | --- |
| Propellant Load (lb.) | 147 | 164 |
| Propellant geometry | Aft finocyl 5 rays | 8 ray fuel grain |
| Total Impulse (lb-sec.) | 34,177 | 39,837 |
| Throttle capability | NO | YES |

Many patents, patent applications and other literature may have been cited throughout this disclosure. The contents of these citations are hereby expressly incorporated into this disclosure by reference.

EXAMPLE 1

Test Comparison of Conventional Solid Motor and the Hybrid Motor

Several parameters of the two different types of rocket motors in a high performance application typical of an Air to Air mission were measured and compared. Both propellant technologies were evaluated using NASA CEA and PROPEP thermochemical performance modeling. The solid grains for both motors were derived from SPP modeling to maximize mass fraction. The hybrid design utilized in the comparison was further handicapped with ultra conservative combustion efficiencies. The comparison results are summarized in Table 1 which illustrates the benefits of the presently disclosed staged combustion hybrid rocket motor over a conventional high mass fraction solid rocket motor. This example demonstrates the density and packaging versatility of the hybrid design which enable more impulse per unit volume for challenging designs such as those required for tactical missile systems.

The examples set forth in this disclosure are illustrative, not exhaustive. The materials, chemicals and other ingredients are presented as typical components or reactants, and the procedures described herein may represent but one of the typical ways to accomplish the goals of the particular procedure. It is understood that various modifications may be derived in view of the foregoing disclosure without departing from the spirit of the present disclosure.

I claim:

1. A rocket motor comprising:
   a housing having a first end portion and a second end portion;
   a first chamber positioned in the first end portion of the housing, said first chamber being adapted to contain solid combustible materials;
   a second chamber positioned in the second end portion, having a bladder disposed therein adapted to store at least one oxidizer;
   a separator positioned to separate said first chamber and second chamber; and
   an injector including a catalyst operably positioned between said first chamber and second chamber;
   a flow controller extending through the separator and coupled to the injector and configured to regulate mixing of the oxidizer with the solid combustable materials.

2. The rocket motor of claim 1, wherein said bladder contains at least one liquid oxidizer.

3. The rocket motor of claim 1, wherein said means for connecting the first and second chambers comprises a conduit adapted to allow the flow of materials from the second chamber to the first chamber.

4. The rocket motor of claim 3, wherein said bladder includes an opening in fluid communication with said conduit.

5. The rocket motor of claim 1, wherein said means for connecting the first and second chambers comprises an injector adapted to inject materials from said second chamber into said first chamber.

6. The rocket motor of claim 5, wherein said means for connecting the first and second chambers comprises a flow controller coupled to the injector for controlling the flow of materials through said connecting means.

7. The rocket motor of claim 1, wherein the catalyst is contained in the means for connecting the first chamber and second chamber.

8. The rocket motor of claim 1, wherein the catalyst is contained inside the injector.

9. The rocket motor of claim 1, wherein the catalyst is a solid catalyst.

10. The rocket motor of claim 9, wherein the catalyst comprises an active metal component selected from the group consisting of platinum group metals, transition group metals, and combinations thereof.

11. The rocket motor of claim 2, wherein the liquid oxidizer is an amine based oxidizer.

12. The rocket motor of claim 11, wherein the liquid oxidizer comprises a mixture of hydroxyl ammonium nitrate and glycerol.

13. A rocket motor comprising:
   a housing having a first end portion and a second end portion;
   a first chamber positioned in the first end portion of the housing, said first chamber being adapted to contain solid combustible materials;
   a second chamber positioned in the second end portion, having a bladder disposed therein adapted to store a mixture of hydroxyl ammonium nitrate and glycerol;
   a separator positioned to separate said first chamber and second chamber; and
   an injector including a catalyst operably positioned between said first chamber and second chamber;
   a flow controller extending through the separator and coupled to the injector and configured to regulate mixing of the oxidizer with the solid combustable materials.

14. A rocket motor comprising:
   a housing having a first end portion and a second end portion;
   a first chamber positioned at the first end portion of the housing, the first chamber being adapted to contain solid combustible materials;
   a second chamber positioned at the second end portion, the second chamber having a bladder disposed therein, the bladder being adapted to store at least one oxidizer and having an opening configured for flow of the oxidizer;
   a separator positioned to separate the first and second chambers;

a gas generator disposed at the second end portion and adjacent the bladder for pressurizing the bladder;

an injector coupled with the opening of the bladder;

a flow controller extending through the separator and coupled to the injector and configured to regulate mixing of the oxidizer with the solid combustible materials; and a catalyst disposed at the injector.

15. The rocket motor of claim 14, wherein the catalyst is a solid catalyst.

16. The rocket motor of claim 15, wherein the catalyst comprises an active metal component selected from the group consisting of platinum group metals, transition group metals, and combinations thereof.

17. The rocket motor of claim 14, wherein the oxidizer includes an amine based oxidizer.

18. The rocket motor of claim 17, wherein the oxidizer includes a mixture of hydroxyl ammonium nitrate and glycerol.

* * * * *